(12) United States Patent
Suzuki et al.

(10) Patent No.: US 11,346,276 B2
(45) Date of Patent: May 31, 2022

(54) COMBUSTION CHAMBER STRUCTURE FOR INTERNAL COMBUSTION ENGINE

(71) Applicant: NISSAN MOTOR CO., LTD., Yokohama (JP)

(72) Inventors: Takuma Suzuki, Kanagawa (JP); Taisuke Shiraishi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/981,812

(22) PCT Filed: Apr. 10, 2018

(86) PCT No.: PCT/IB2018/000681
§ 371 (c)(1),
(2) Date: Sep. 17, 2020

(87) PCT Pub. No.: WO2019/197860
PCT Pub. Date: Oct. 17, 2019

(65) Prior Publication Data
US 2021/0115841 A1    Apr. 22, 2021

(51) Int. Cl.
*F02B 23/10* (2006.01)
*F02F 1/24* (2006.01)

(52) U.S. Cl.
CPC .......... *F02B 23/104* (2013.01); *F02B 23/105* (2013.01); *F02B 23/101* (2013.01); *F02B 2023/102* (2013.01); *F02B 2023/106* (2013.01); *F02B 2023/108* (2013.01); *F02B 2275/48* (2013.01); *F02F 1/242* (2013.01); *F02F 2001/241* (2013.01)

(58) Field of Classification Search
None
See application file for complete search history.

(56) References Cited

U.S. PATENT DOCUMENTS

| | | | | |
|---|---|---|---|---|
| 3,999,532 A | * | 12/1976 | Kornhauser | F02B 19/108 123/263 |
| 5,127,379 A | * | 7/1992 | Kobayashi | F02B 25/145 123/193.5 |
| 5,209,200 A | | 5/1993 | Ahern et al. | |
| 5,724,937 A | * | 3/1998 | Bezner | F02B 23/101 123/275 |
| 5,813,385 A | * | 9/1998 | Yamauchi | F02B 23/101 123/295 |
| 5,816,215 A | * | 10/1998 | Yoshikawa | F02B 23/104 123/301 |
| 5,927,244 A | * | 7/1999 | Yamauchi | F02B 23/101 123/307 |
| 5,960,766 A | * | 10/1999 | Hellmich | F02F 3/26 123/298 |

(Continued)

FOREIGN PATENT DOCUMENTS

| | | | |
|---|---|---|---|
| DE | 19962293 A1 * | 6/2001 | ............. F02B 15/00 |
| DE | 10018777 A1 * | 10/2001 | ............. F02B 23/105 |

(Continued)

*Primary Examiner* — Kevin R Steckbauer
(74) *Attorney, Agent, or Firm* — Foley & Lardner LLP

(57) ABSTRACT

A combustion chamber structure for an internal combustion engine includes a recessed portion formed in a pent roof of a cylinder head on an upstream side of a tumble flow with respect to a spark plug.

11 Claims, 7 Drawing Sheets

(56) References Cited

U.S. PATENT DOCUMENTS

| | | | | |
|---|---|---|---|---|
| 5,960,767 A * | 10/1999 | Akimoto | | F02B 31/00 |
| | | | | 123/301 |
| 5,996,548 A * | 12/1999 | Hellmich | | F02M 51/04 |
| | | | | 123/298 |
| 6,152,103 A * | 11/2000 | Kudo | | F02B 23/104 |
| | | | | 123/298 |
| 6,158,409 A * | 12/2000 | Gillespie | | F02B 23/105 |
| | | | | 123/193.6 |
| 6,158,410 A * | 12/2000 | Piock | | F02B 23/104 |
| | | | | 123/301 |
| 6,220,215 B1 * | 4/2001 | Morimoto | | F02B 23/104 |
| | | | | 123/193.6 |
| 6,357,402 B1 * | 3/2002 | Kato | | F02M 55/004 |
| | | | | 123/73 CA |
| 6,378,486 B1 * | 4/2002 | Spiegel | | F02B 23/104 |
| | | | | 123/298 |
| 6,443,122 B1 * | 9/2002 | Denbratt | | F02B 23/104 |
| | | | | 123/301 |
| 6,561,153 B2 * | 5/2003 | Uchida | | F02F 1/242 |
| | | | | 123/193.5 |
| 6,629,519 B1 * | 10/2003 | Bertsch | | F02M 45/02 |
| | | | | 123/305 |
| 6,651,615 B2 * | 11/2003 | Suzuki | | F02B 17/005 |
| | | | | 123/298 |
| 6,892,693 B2 * | 5/2005 | Montgomery | | F02B 23/101 |
| | | | | 123/279 |
| 7,086,378 B2 * | 8/2006 | Tanaka | | F02B 23/101 |
| | | | | 123/301 |
| 8,074,621 B2 * | 12/2011 | Hata | | F02M 61/1813 |
| | | | | 123/298 |
| 10,156,182 B2 * | 12/2018 | Narahara | | F02B 23/101 |
| 10,309,322 B2 * | 6/2019 | Hoshi | | F02P 5/1504 |
| 10,385,802 B2 * | 8/2019 | Nakaji | | F02B 23/10 |
| 10,436,134 B2 * | 10/2019 | Hayashi | | F02P 5/045 |
| 2002/0014219 A1 * | 2/2002 | Suzuki | | F02F 1/242 |
| | | | | 123/305 |
| 2002/0073958 A1 * | 6/2002 | Wright | | F02B 23/101 |
| | | | | 123/305 |
| 2002/0134341 A1 * | 9/2002 | Uchida | | F02F 1/4214 |
| | | | | 123/193.5 |
| 2004/0154579 A1 * | 8/2004 | Montgomery | | F02B 23/101 |
| | | | | 123/279 |
| 2005/0139191 A1 * | 6/2005 | Tanaka | | F02B 23/101 |
| | | | | 123/305 |
| 2010/0065018 A1 * | 3/2010 | Hata | | F02M 61/1813 |
| | | | | 123/307 |
| 2017/0356330 A1 * | 12/2017 | Narahara | | F02B 23/10 |
| 2018/0080407 A1 * | 3/2018 | Nakaji | | F02B 23/10 |
| 2018/0298832 A1 * | 10/2018 | Hoshi | | F02M 61/182 |
| 2018/0306135 A1 * | 10/2018 | Hayashi | | F02B 31/00 |

FOREIGN PATENT DOCUMENTS

| | | | | |
|---|---|---|---|---|
| DE | 102018000285 A1 * | 7/2019 | | F02B 23/10 |
| EP | 1 179 662 A2 | 2/2002 | | |
| GB | 2039614 A | 8/1980 | | |
| JP | 5-507981 A | 11/1993 | | |
| JP | 10131757 A * | 5/1998 | | F02F 1/242 |
| JP | 10131758 A * | 5/1998 | | F02B 23/101 |
| JP | 10220229 A * | 8/1998 | | F02B 17/005 |
| JP | 10317974 A * | 12/1998 | | F02B 23/10 |
| JP | 11-200867 A | 7/1999 | | |
| JP | 2008-303798 A | 12/2008 | | |
| JP | 2015-218621 A | 12/2015 | | |
| JP | 2015218621 A * | 12/2015 | | F02B 23/105 |
| JP | 2016-121631 A | 7/2016 | | |
| JP | 2016121631 A * | 7/2016 | | F02B 23/10 |

* cited by examiner

COMBUSTION CHAMBER STRUCTURE FOR INTERNAL COMBUSTION ENGINE

TECHNICAL FIELD

The present invention relates to a combustion chamber structure for an internal combustion engine.

BACKGROUND ART

JP 2008-303798 A discloses an internal combustion engine configured to enable ignition without requiring high ignition energy in performing dilution combustion by providing one of two spark plugs at a position where the flow velocity of a tumble flow is high and providing the other one at a position close to the vortex center of the tumble flow.

SUMMARY OF INVENTION

However, the above-described internal combustion engine does not have a structure based on the characteristics of the tumble flow, and thus has a problem that the dilution combustion strength decreases due to variations in the flow velocity or the flow direction of the tumble flow.

The present invention has been made in view of such a technical problem. It is an object of the present invention to provide a combustion chamber structure for an internal combustion engine capable of suppressing flow variations in a tumble flow.

According to one aspect of the present invention, a combustion chamber structure for an internal combustion engine includes a recessed portion formed in a pent roof of a cylinder head on an upstream side of a tumble flow with respect to a spark plug.

DESCRIPTION OF EMBODIMENTS

First Embodiment

Hereinafter, the structure of a combustion chamber 101 of an internal combustion engine 100 according to a first embodiment of the present invention is described with reference to the accompanying drawings.

Figure 1:
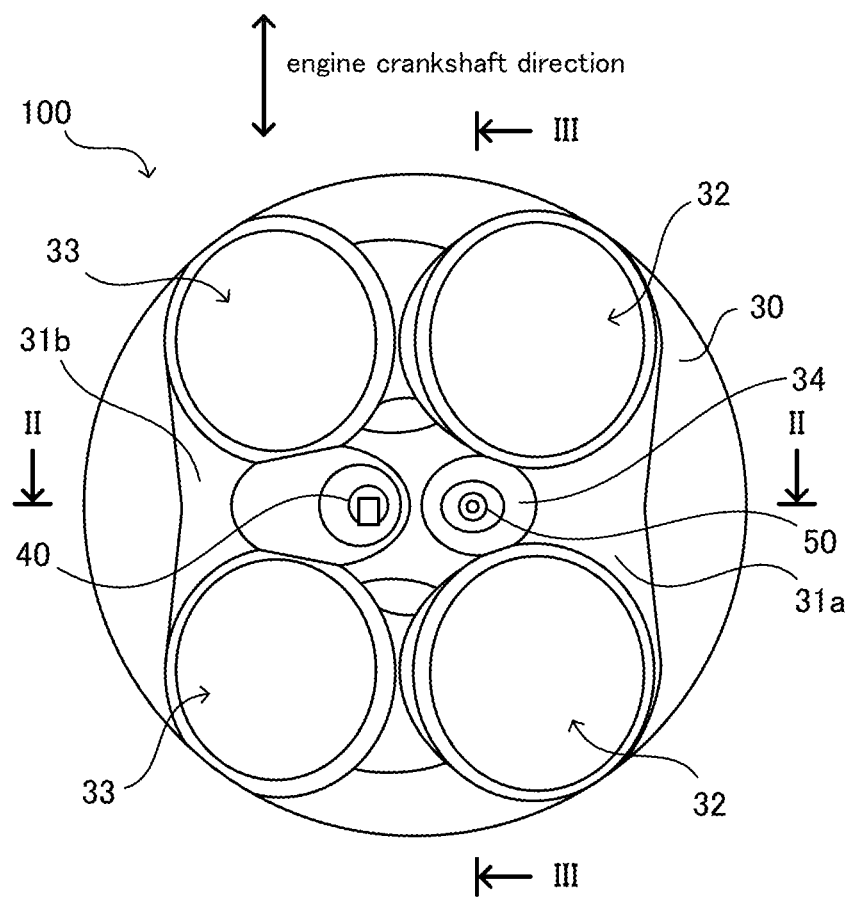
FIG. 1 is a schematic view in which a cylinder head of an internal combustion engine according to a first embodiment of the present invention is viewed from the side of a combustion chamber.
Figure 2:
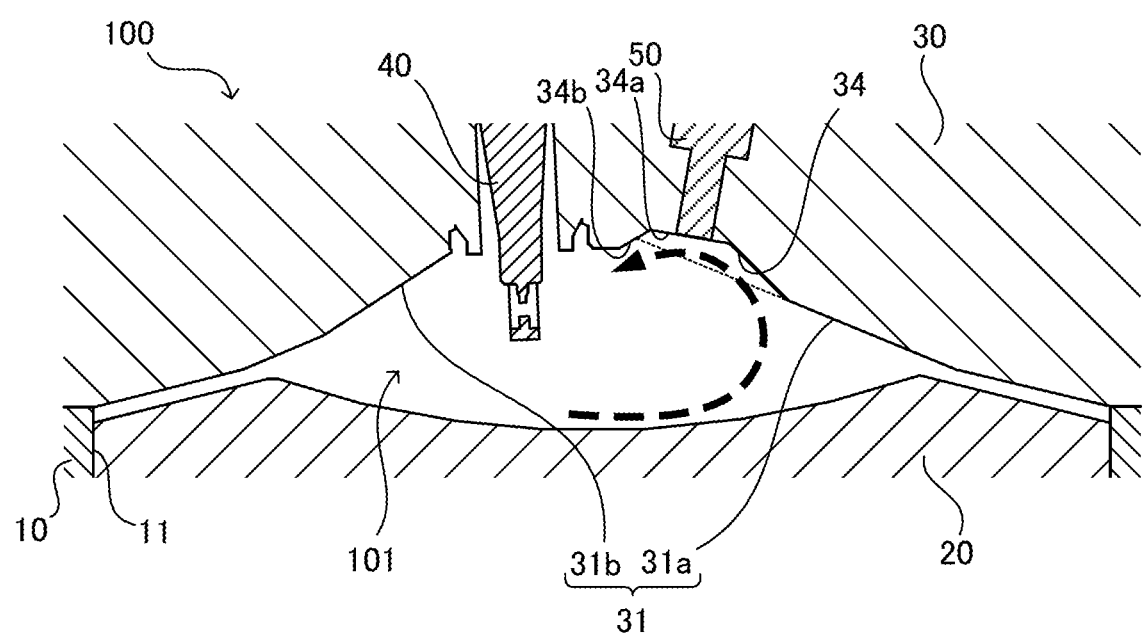
FIG. 2 is a schematic cross-sectional view of the combustion chamber along the II-II line of FIG. 1.
Figure 3:
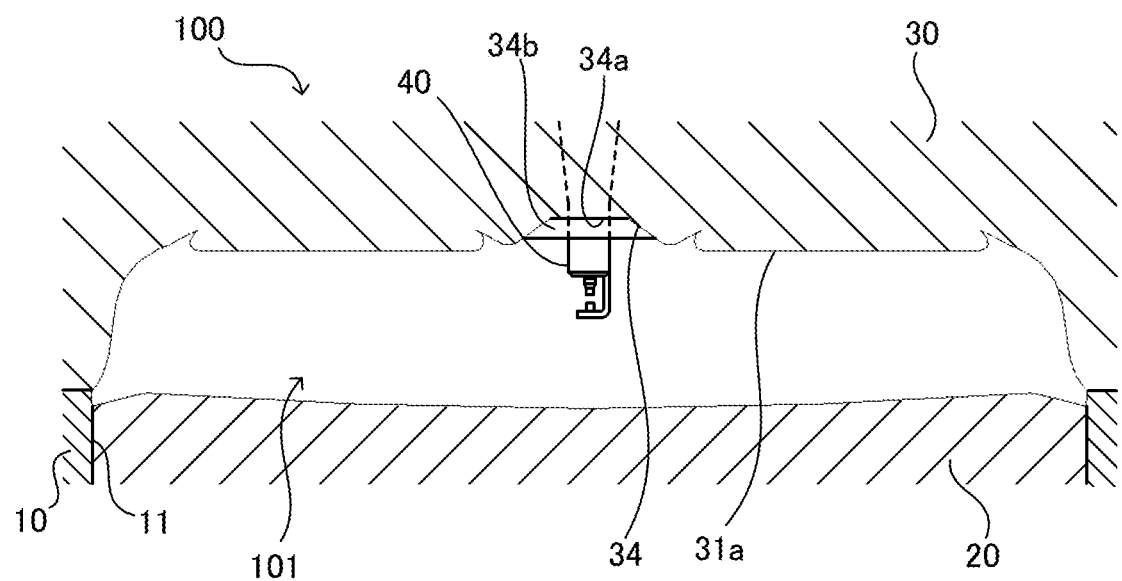
FIG. 3 is a schematic cross-sectional view of the combustion chamber along the III-III line of FIG. 1.

FIG. 1 is a schematic view in which a cylinder head 30 of the internal combustion engine 100 according to the first embodiment of the present invention is viewed from the combustion chamber 101 side. FIG. 2 is a schematic cross-sectional view of the combustion chamber 101 along the II-II line of FIG. 1. FIG. 3 is a schematic cross-sectional view of the combustion chamber 101 along the III-III line of FIG. 1.

The internal combustion engine 100 is provided with a cylinder block 10, a piston 20 provided in a cylinder 11 formed in the cylinder block 10, a cylinder head 30 provided above the cylinder block 10 and closing the cylinder 11, and a spark plug 40 and an injector 50 provided in the cylinder head 30 as illustrated in FIG. 2. The internal combustion engine 100 may be a single cylinder or may be a multicylinder.

The cylinder head 30 has a pent roof surface 31 configuring the upper surface of the combustion chamber 101. As illustrated in FIG. 1, the pent roof surface 31 is configured of a roof surface 31a on the intake side where two intake ports 32 are formed and a roof surface 31b on the exhaust side where two exhaust ports 33 are formed. In FIG. 1, the illustration of an intake valve and an exhaust valve is omitted.

Between the two intake ports 32 in the roof surface 31a, a recessed portion 34 recessed upward with the roof surface 31a as the reference plane (dotted line) is formed as illustrated in FIG. 2. In this embodiment, the injector 50 is provided in the recessed portion 34.

As illustrated in FIG. 3, the spark plug 40 and the recessed portion 34 are disposed side by side along a direction orthogonal to the cross section along the III-III line of FIG. 1. The direction orthogonal to the cross section along the III-III line of FIG. 1 is, in other words, a direction parallel to a direction orthogonal to an engine crankshaft and a cylinder shaft. In FIG. 3, the illustration of the injector 50 is omitted.

In this embodiment, the spark plug 40 is provided slightly on the roof surface 31b side relative to a center portion of the combustion chamber 101.

In an operation of the internal combustion engine 100, a tumble flow is generated in the combustion chamber 101 as indicated by the dashed arrow in FIG. 2. The tumble flow of this embodiment is a flow (normal tumble flow) in a direction in which intake flowing into the combustion chamber 101 from the intake ports 32 flows along the wall surface of the cylinder 11 on the exhaust side, the top surface of the piston 20, and the wall surface of the cylinder 11 on the intake side in this order.

The internal combustion engine 100 has the recessed portion 34 formed in the pent roof surface 31 as described above. Therefore, the tumble flow flowing along the pent roof surface 31 is concentrated to the recessed portion 34 and rectified, and then the rectified flow is directed toward the spark plug 40. Thus, the flow velocity or the flow direction of the tumble flow directed toward the spark plug 40 is stabilized.

More specifically, this embodiment can suppress flow variations in the tumble flow directed toward the spark plug 40, and therefore can realize stable ignition and combustion even under dilution combustion, such as in a lean combustion region or during the execution of control of EGR (Exhaust Gas Recirculation). Thus, the combustion strength under the dilution combustion is improved. As a result, the fuel consumption is improved and the generation of an environmentally harmful substance (NOx) is also suppressed.

Moreover, in this embodiment, the injector 50 is provided in the recessed portion 34, and therefore the recessed portion 34 also functions as a relief portion of fuel sprayed from the injector 50. Therefore, even when the recessed portion 34 is provided in the pent roof surface 31, the injector 50 can be easily disposed. The injector 50 may be provided at positions other than the recessed portion 34.

Then, the recessed portion 34 is described in more detail with reference to FIG. 4.

Figure 4:
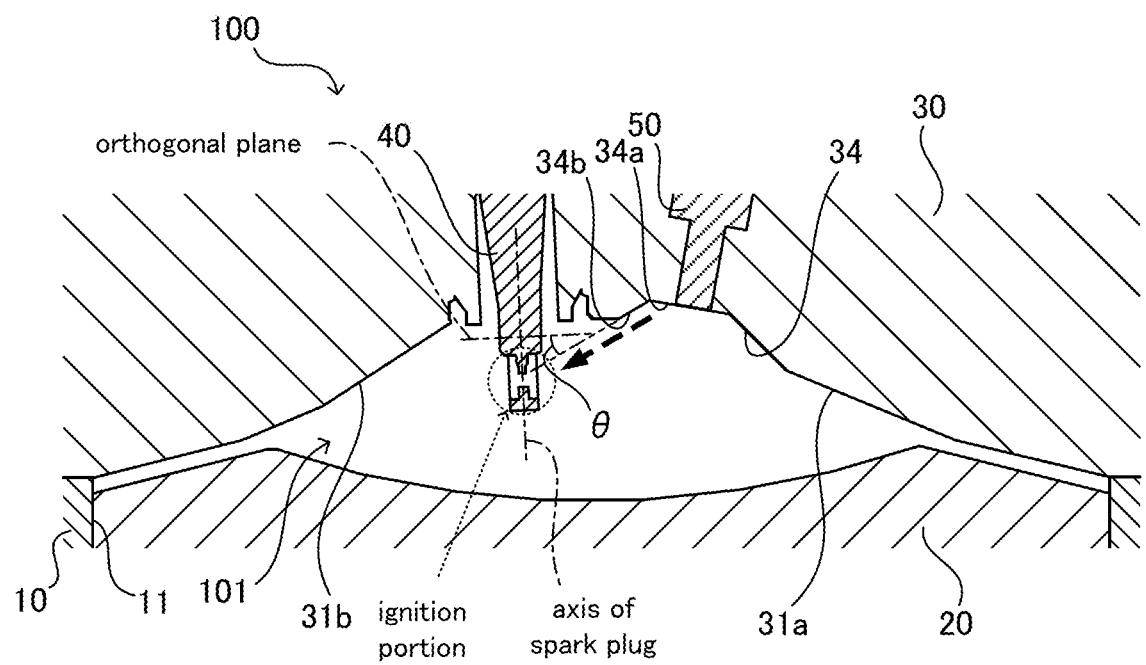
FIG. 4 is a schematic cross-sectional view for explaining a recessed portion.

The recessed portion 34 has an inclined surface 34b inclined from a bottom portion 34a of the recessed portion 34 toward the spark plug 40 on the spark plug 40 side as illustrated in FIG. 4.

Thus, the tumble flow concentrated to the recessed portion 34 is rectified to flow along the inclined surface 34b to be a flow directed toward the spark plug 40. Therefore, the uniformity of the tumble flow directed toward the spark plug 40 is improved.

Moreover, as indicated by the chain double-dashed line extending from the inclined surface 34b, an ignition portion of the spark plug 40 is located on the extension of the inclined surface 34b.

Thus, the ignition portion is located at the destination toward which the rectified tumble flow is directed, and therefore a discharge channel generated in the ignition portion can be stably extended.

As indicated by an angle θ, the inclined surface 34b is inclined downward toward the tip side of the spark plug 40 relative to a plane orthogonal to the axis of the spark plug 40 (hereinafter referred to as an orthogonal plane).

This can prevent the contact of the discharge channel with the upper surface (roof surface 31b) of the combustion chamber 101 on the downstream side of the tumble flow with respect to the spark plug 40, so that stable ignition can be realized.

Then, the maximum height position of the combustion chamber 101 is described with reference to FIG. 5.

Figure 5:
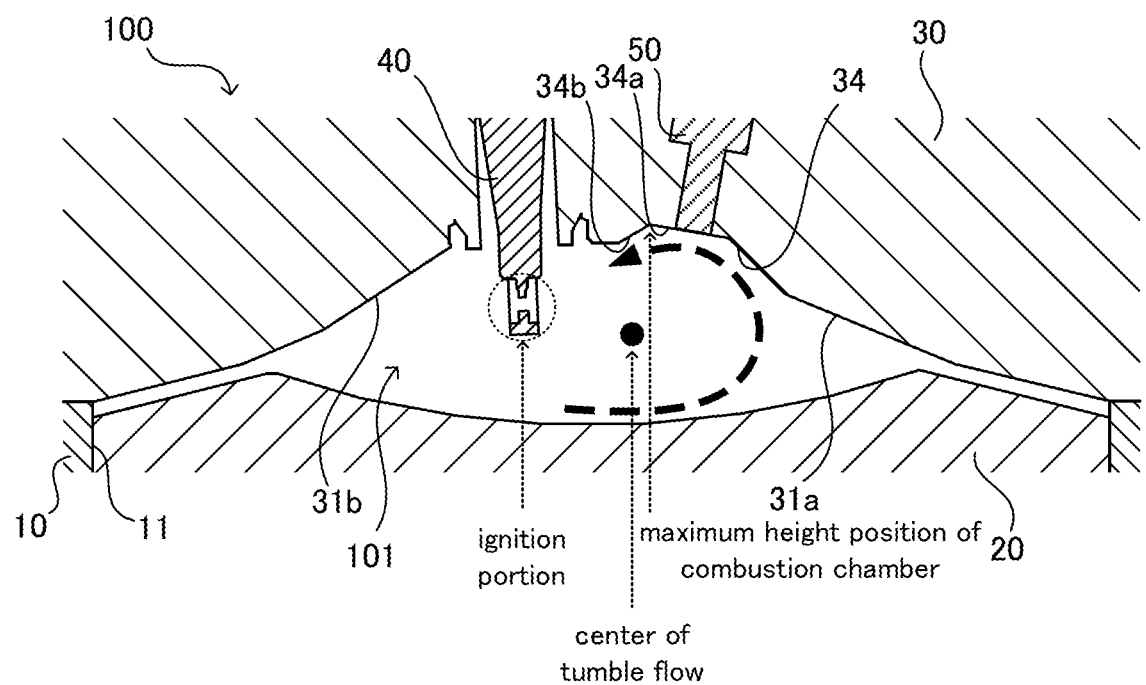
FIG. 5 is a schematic cross-sectional view for explaining the maximum height position of the combustion chamber.

In this embodiment, the maximum height position of the combustion chamber 101 is located on the upstream side of the tumble flow with respect to the spark plug 40 as illustrated in FIG. 5. The center of the tumble flow is located on the upstream side of the tumble flow with respect to the spark plug 40.

Due to the fact that the maximum height position of the combustion chamber 101 is located on the upstream side of the tumble flow with respect to the spark plug 40, the tumble flow center is located closer to the intake side relative to the spark plug 40. When the tumble flow center is present on the upstream side of the tumble flow relative to the spark plug 40, the flow direction of the tumble flow with respect to the spark plug 40 can be directed downward relative to the horizontal and the flow rectified in the recessed portion 34 is directed toward the spark plug 40. Therefore, the flow directed toward the spark plug 40 can be stabilized.

As described above, the structure of the combustion chamber 101 of this embodiment has the recessed portion 34 formed in the pent roof surface 31 of the cylinder head 30 on the upstream side of the tumble flow with respect to the spark plug 40.

The recessed portion 34 and the spark plug 40 are provided side by side in a direction parallel to the direction orthogonal to the engine crankshaft and the cylinder shaft.

Thus, the tumble flow flowing along the pent roof surface 31 is concentrated to the recessed portion 34 and rectified, and then the rectified flow is directed toward the spark plug 40. Therefore, the flow variations in the tumble flow directed toward the spark plug 40 can be suppressed.

Moreover, the injector 50 is provided in the recessed portion 34.

Thus, the recessed portion 34 functions as the relief portion of the fuel sprayed from the injector 50. Therefore, even when the recessed portion 34 is provided in the pent roof surface 31, the injector 50 can be easily disposed.

The tumble flow is the flow in the direction in which the intake flowing into the combustion chamber 101 flows along the wall surface of the cylinder 11 on the exhaust side, the top surface of the piston 20, and the wall surface of the cylinder 11 on the intake side in this order.

The recessed portion 34 is formed in the roof surface 31a on the intake side in the pent roof surface 31.

Thus, the tumble flow can be efficiently rectified.

The recessed portion 34 has the inclined surface 34b inclined toward the spark plug 40 on the spark plug 40 side.

Thus, the tumble flow concentrated to the recessed portion 34 is rectified to flow along the inclined surface 34b to be a flow directed toward the spark plug 40, and therefore the uniformity of the tumble flow directed toward the spark plug 40 is improved.

The inclined surface 34b is inclined downward toward the tip side of the spark plug 40 relative to the orthogonal plane.

Thus, the contact of the discharge channel with the upper surface (roof surface 31b) of the combustion chamber 101 on the downstream side of the tumble flow with respect to the spark plug 40 can be suppressed, so that stable ignition can be realized.

The ignition portion of the spark plug 40 is located on the extension of the inclined surface 34b.

Thus, the ignition portion is located at the destination toward which the rectified tumble flow is directed, and therefore the discharge channel generated in the ignition portion can be stably extended.

The maximum height position of the combustion chamber 101 is located on the upstream side of the tumble flow with respect to the spark plug 40.

The center of the tumble flow is located on the upstream side of the tumble flow with respect to the spark plug 40.

Due to the fact that the maximum height position of the combustion chamber 101 is located on the upstream side of the tumble flow with respect to the spark plug 40, the tumble flow center is located closer to the intake side relative to the spark plug 40. When the tumble flow center is present on the upstream side of the tumble flow relative to the spark plug 40, the flow direction of the tumble flow with respect to the spark plug 40 can be directed downward relative to the horizontal and the flow rectified in the recessed portion 34 is directed toward the spark plug 40, and therefore the flow directed toward the spark plug 40 can be stabilized.

Second Embodiment

Figure 6:
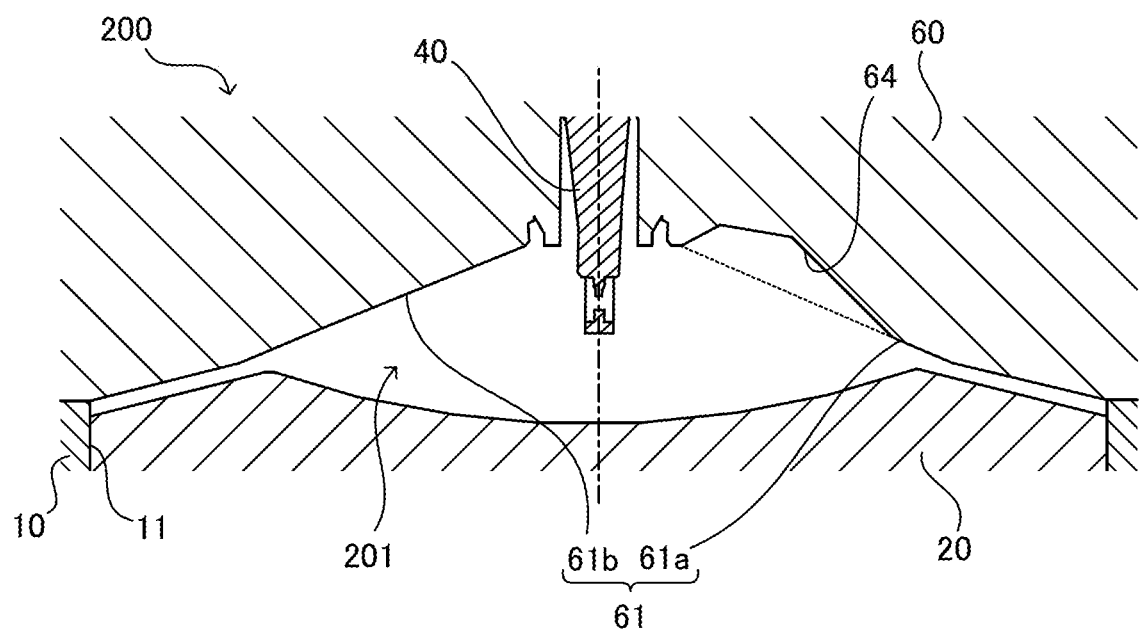
FIG. 6 is a schematic cross-sectional view of a combustion chamber of an internal combustion engine according to a second embodiment of the present invention.

Then, the structure of a combustion chamber 201 of an internal combustion engine 200 according to a second embodiment of the present invention is described with reference to FIG. 6. FIG. 6 is a schematic cross-sectional view of the combustion chamber 201 of the internal combustion engine 200 and corresponds to FIG. 2 of the first embodiment. Hereinafter, differences from the first embodiment are mainly described and a description of the same configurations as those of the first embodiment is omitted.

The internal combustion engine 200 is provided with a cylinder block 10, a piston 20 provided in a cylinder 11 formed in the cylinder block 10, a cylinder head 60 provided above the cylinder block 10 and closing the cylinder 11, and a spark plug 40 and an injector (not illustrated) provided in the cylinder head 60.

The cylinder head 60 has a pent roof surface 61 configuring the upper surface of the combustion chamber 201. The pent roof surface 61 is configured of a roof surface 61a on the intake side where two intake ports (not illustrated) are formed and a roof surface 61b on the exhaust side where two exhaust ports (not illustrated) are formed.

Between the two intake ports 32 in the roof surface 61a, a recessed portion 64 recessed upward with the roof surface 61a as the reference plane (dotted line) is formed.

In this embodiment, the spark plug 40 is located in a center portion of the combustion chamber 201 in the radial direction of the cylinder 11.

Therefore, as the structure of the combustion chamber 201 of the internal combustion engine 200, a side direct-injection injector or port injection can be adopted.

Moreover, the internal combustion engine 200 has the recessed portion 64 formed in the pent roof surface 61 as described above. Therefore, a tumble flow flowing along the pent roof surface 61 is concentrated to the recessed portion 64 and rectified, and then the rectified flow is directed toward the spark plug 40. Thus, the flow velocity or the flow direction of the tumble flow directed toward the spark plug 40 is stabilized.

As described above, according to the structure of the combustion chamber 201 of this embodiment, flow variations in the tumble flow directed toward the spark plug 40 can be suppressed and the side direct-injection injector or the port injection can be adopted.

Third Embodiment

Figure 7:
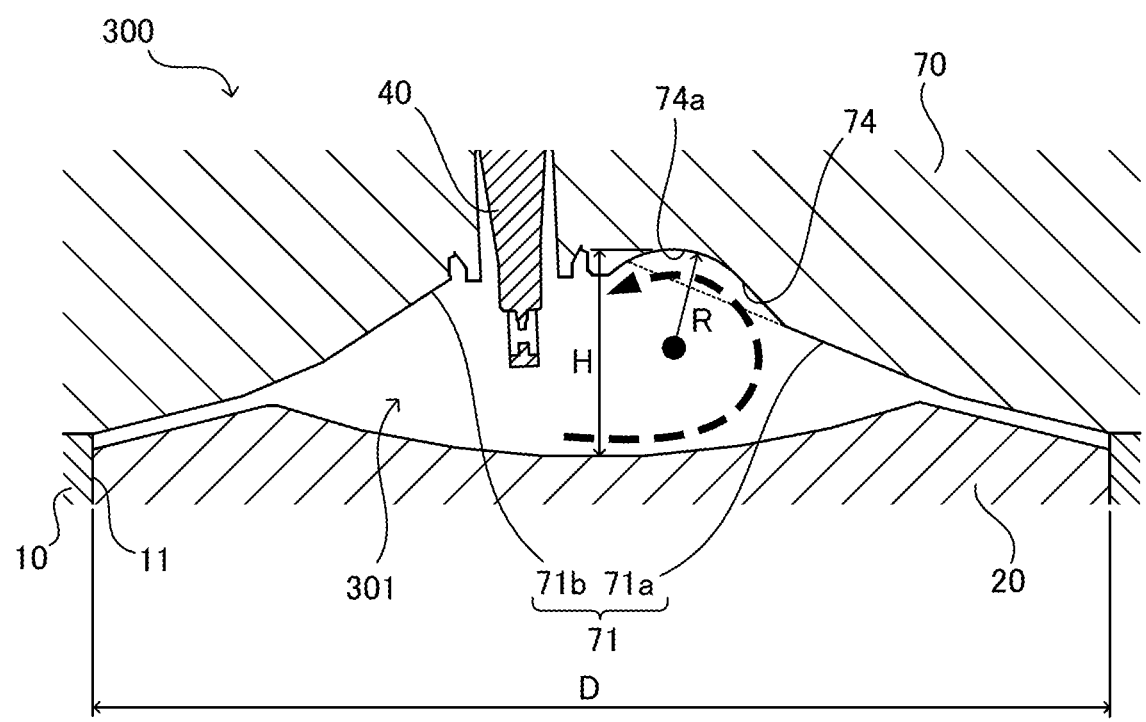
FIG. 7 is a schematic cross-sectional view of a combustion chamber of an internal combustion engine according to a third embodiment of the present invention.

Then, the structure of a combustion chamber 301 of an internal combustion engine 300 according to a third embodiment of the present invention is described with reference to FIG. 7. FIG. 7 is a schematic cross-sectional view of the combustion chamber 301 of the internal combustion engine 300 and corresponds to FIG. 2 of the first embodiment. Hereinafter, differences from the first embodiment are mainly described and a description of the same configurations as those of the first embodiment is omitted.

The internal combustion engine 300 is provided with a cylinder block 10, a piston 20 provided in a cylinder 11 formed in the cylinder block 10, a cylinder head 70 provided above the cylinder block 10 and closing the cylinder 11, and a spark plug 40 and an injector (not illustrated) provided in the cylinder head 70.

The cylinder head 70 has a pent roof surface 71 configuring the upper surface of the combustion chamber 301. The pent roof surface 71 is configured of a roof surface 71a on the intake side where two intake ports (not illustrated) are formed and a roof surface 71b on the exhaust side where two exhaust ports (not illustrated) are formed.

Between the two intake ports in the roof surface 71a, a recessed portion 74 recessed upward with the roof surface 71a as the reference plane (dotted line) is formed.

In this embodiment, in the recessed portion 74, a part of the cross-sectional shape is formed by an arc 74a. A curvature radius R of the arc 74a is set so that a diameter 2R of a circle including the arc 74a is larger than a height H of the combustion chamber 301 in a most compressed state and is smaller than a bore diameter D of the combustion chamber 301. In the recessed portion 74, the entire cross-sectional shape may be formed by an arc.

When the size of the curvature radius R of the arc 74a and the size of the curvature radius of a tumble flow are closer to each other, the tumble flow can be rectified while suppressing a pressure loss. Herein, the curvature radius of the tumble flow is geometrically set to a size between H/2 and D/2.

Therefore, by setting the curvature radius R of the arc 74a so that the diameter 2R of the circle including the arc 74a is larger than the height H and smaller than the bore diameter D, the tumble flow can be rectified while suppressing a pressure loss.

As described above, according to the structure of the combustion chamber 301 of this embodiment, flow variations in a tumble flow directed toward the spark plug 40 can be suppressed while suppressing a pressure loss.

As described above, the embodiments of the present invention are described. However, the embodiments merely exemplify some of application examples of the present invention and do not intend to limit the technical scope of the present invention to the specific configurations of the embodiments described above.

For example, the recessed portions 34, 64, and 74 are formed in the roof surfaces 31a, 61a, and 71a, respectively, on the intake side in the embodiments described above. However, depending on the position of the spark plug 40, the recessed portions may be formed in the roof surface on the exhaust side on the upstream side of the tumble flow with respect to the spark plug 40. Also in this case, the effect that a tumble flow flowing along the pent roof surface of the cylinder head is concentrated to the recessed portions and rectified, and then the rectified flow is directed toward the spark plug 40 can be obtained.

The configurations of the embodiments can be used in appropriate combinations.

The invention claimed is:

1. A combustion chamber structure for an internal combustion engine comprising:
a recessed portion formed in a pent roof surface of a cylinder head on an upstream side of a tumble flow with respect to a spark plug, wherein
the recessed portion is formed in an intake side roof surface of the pent roof surface, and
an entire ignition portion of the spark plug is located on an exhaust side roof surface side relative to a central longitudinal axis of a cylinder.

2. The combustion chamber structure for an internal combustion engine according to claim 1, wherein
the tumble flow is a flow in a direction in which intake flowing into the combustion chamber flows along a wall surface of the cylinder on an exhaust side, a top surface of a piston, and a wall surface of the cylinder on an intake side in this order.

3. The combustion chamber structure for an internal combustion engine according to claim 1, wherein
the recessed portion has an inclined surface inclined toward the spark plug on a side of the spark plug.

4. The combustion chamber structure for an internal combustion engine according to claim 3, wherein
the inclined surface is inclined downward toward a tip side of the spark plug relative to a plane orthogonal to an axis of the spark plug.

5. The combustion chamber structure for an internal combustion engine according to claim 3, wherein
the ignition portion of the spark plug is located on an extension of the inclined surface.

6. The combustion chamber structure for an internal combustion engine according to claim 1, wherein
a maximum height position of the combustion chamber is located on the upstream side of the tumble flow with respect to the spark plug.

7. The combustion chamber structure for an internal combustion engine according to claim 6, wherein
a center of the tumble flow is located on the upstream side of the tumble flow with respect to the spark plug.

8. The combustion chamber structure for an internal combustion engine according to claim 1, wherein
the recessed portion and the spark plug are provided side by side in a direction parallel to a direction orthogonal to an engine crankshaft and the central longitudinal axis of the cylinder.

9. The combustion chamber structure for an internal combustion engine according to claim 1, wherein
in the recessed portion, at least one part of a shape of a cross section orthogonal to an engine crankshaft is formed by an arc, and
a diameter of a circle including the arc is larger than a height of the combustion chamber in a most compressed state and smaller than a bore diameter of the combustion chamber, the circle passing through an apex of the recessed portion.

10. The combustion chamber structure for an internal combustion engine according to claim 1, wherein
the recessed portion is recessed upward with the intake side roof surface as a reference plane.

11. The combustion chamber structure for an internal combustion engine according to claim 1, wherein
the recessed portion is configured to concentrate and direct the tumble flow in a direction toward the ignition portion of the spark plug.

* * * * *